Aug. 31, 1965   A. V. PRETOT, JR   3,203,531
DETECTION DEVICE FOR CONVEYORS
Filed July 11, 1963                         2 Sheets-Sheet 1

INVENTOR.
ARMAND V. PRETOT JR.
BY
ATTORNEYS

Aug. 31, 1965  A. V. PRETOT, JR  3,203,531
DETECTION DEVICE FOR CONVEYORS
Filed July 11, 1963  2 Sheets-Sheet 2
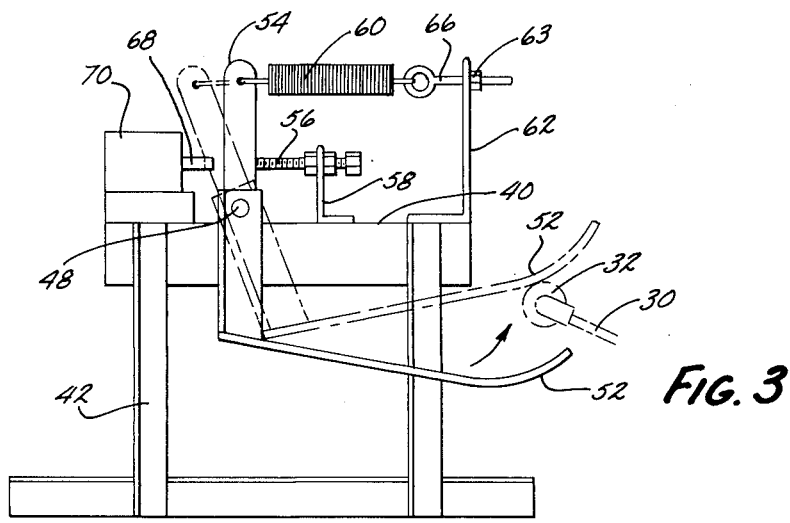
FIG. 3
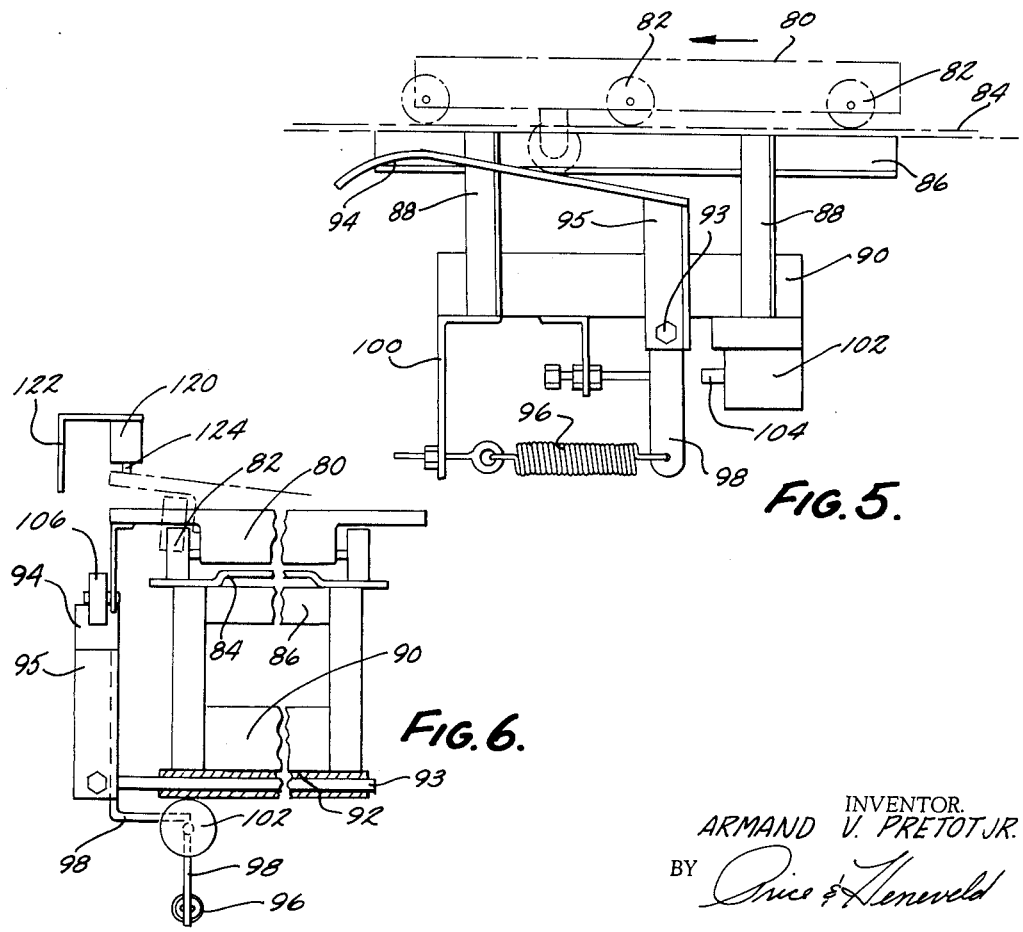
FIG. 5.
FIG. 6.
INVENTOR.
ARMAND V. PRETOT JR.
BY
ATTORNEYS United States Patent Office 3,203,531
Patented Aug. 31, 1965

3,203,531
DETECTION DEVICE FOR CONVEYORS
Armand V. Pretot, Jr., Glen Ellyn, Ill., assignor to Rapistan-Keystone, Inc., Detroit, Mich., a corporation of Michigan
Filed July 11, 1963, Ser. No. 294,336
9 Claims. (Cl. 198—40)

This invention relates to conveyors, and more particularly to a conveyor system detection apparatus capable of differentiating between carriers having a load of at least a predetermined amount thereon, and empty or only partially loaded carriers having less than said predetermined load.

Widespread adoption of conveyors in automated and semi-automated systems of manufacture, storage, assembly and process treatment, often necessitates automated or semi-automated control of conveyor carrier routing for optimum efficiency. As an example, a plurality of carriers on a conveyor track may include fully loaded, partially loaded, and empty carriers in mixed arrangement. Ordinarily, each should be differentiated from the other since they will have separate destinations, depending upon their load characteristics. Or perhaps it may be desired to differentiate between them to enable the empty and half filled carriers to be loaded by automatic actuation of loading apparatus. Or perhaps some carriers should be recycled before proceeding to the next operation. As still another example, perhaps only full ones should be counted. To fulfill any of these or many other similar functions automatically, the different types of loads must first be differentiated from each other.

Some degree of control of carriers has been achieved heretofore by employing coding systems on each carrier which are preset by hand and on selectors along the conveyor. Detection of some load conditions has also been achieved automatically in some instances by electronic systems employing photocell equipment, for example. These types of systems have definite limitations, both economically and functionally.

It is the primary object of this invention to provide a detection means for a conveyor system capable of automatically differentiating between carriers loaded with a predetermined amount and those not so loaded. In pursuance of this object, it is another object of this invention to provide a conveyor and detection system capable of automatically differentiating between carriers on the basis of weight so that heavier loaded carriers cause one type of reaction, and light, unloaded or partially loaded carriers cause a different type of reaction. Consequently, the differentiating action can be used to operate a selective gating mechanism for the different carriers to control their destination, or an unloading mechanism for full carriers, or a loading mechanism for empty carriers, or a counting device, or a particular processing operation, or countless other operations. Any one or more operations can be activated, deactivated or otherwise controlled upon receiving or failing to receive a signal from a weight responsive detector forming a major component of the differentiating system.

It is another object of this invention to provide a weight responsive detector system especially adapted for high speed operation on overhead trolley conveyors, but also applicable to other types of tracks and carriers. The detector is characterized by only a momentary and temporary reaction by the passing carrier, so as to be immediately capable of responding to a closely following carrier. Successive carriers are accommodated without large spacing being required between them.

Another object of this invention is to provide carrier load sensing and differentiating apparatus capable of operations while employing only simple mechanical elements which are relatively inexpensive to construct, assemble, and maintain. No complex electronic apparatus is needed. Differentiation occurs with simple pivotal movement of mechanical elements. The output signal or response from the detector may be electric, pneumatic, hydraulic, or mechanical as desired, to create the effect necessary. No added power means is necessary to operate the detector. No special code pins or slots are necessary for the carrier to actuate the detector.

These and other objects of this invention will be apparent upon studying the following specification in conjunction with the drawings in which:

FIG. 3 is a side elevational view of the apparatus illustrated in FIGS. 1 and 2;

FIG. 5 is a side elevational view of a second form of the novel apparatus used in combination with a floor mounted conveyor;

FIG. 6 is an end elevational view of the apparatus illustrated in FIG. 5, taken from plane VI—VI.

Briefly, the novel system centers around a unique detection means responsive to the weight of an empty, a partially loaded, or a fully loaded carrier to shift and respond, or fail to shift and respond, and/or to cause the carrier to shift and respond, to thereby differentiate carriers by load weight, and a triggering means responsive to a predetermined shift of the detector, or failure thereof, or to the shift of the carrier or the failure thereof, to activate other operational means associated with the conveyor.

Figure 1:
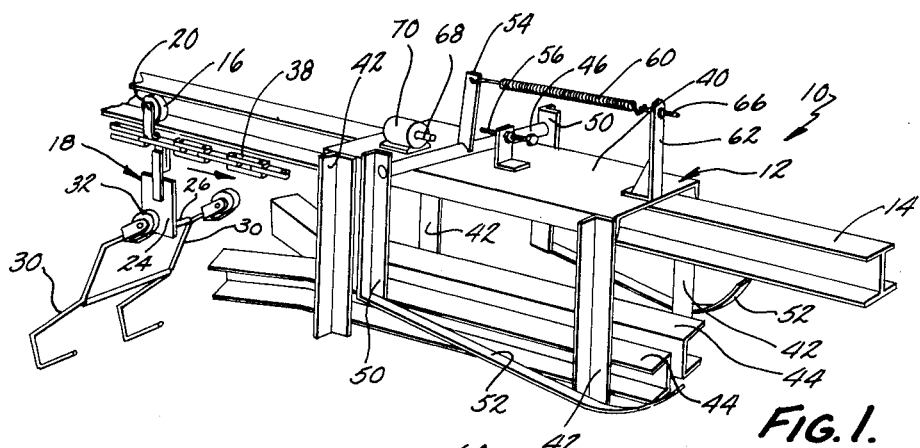
FIG. 1 is a perspective view illustrating one form of the novel apparatus in combination with an overhead conveyor.

Referring now specifically to the drawings, in the form of the inventive apparatus 10 illustrated in FIG. 1, the detection means 12 is shown mounted to and above a conventional overhead conveyor. The overhead conveyor track 14 may have the conventional I-shaped cross-sectional configuration. The lower flange provides running surfaces for a pair of spaced wheels 16 supporting a depending carrier or trolley 18. Each of the wheels is rotatably mounted on the upper end of one part of a stepped bracket 20. The lower end of the bracket parts are secured together to support plate 24 of trolley 18.

Secured to the lower edge of plate 24 as by weldment is a tubular bearing sleeve 26 extending horizontally and transversely of track 14. Extending through this sleeve 26 is a rod 28. On the opposite ends of this rod is a pair of like hangers 30, having hooks on their lower ends and wheels 32 on their upper ends. The hooks and wheels are on opposite sides of the fulcrum axis of rod 28. Rod 28 is pivotal within sleeve 26, to cause wheels 32 to be depressed with elevation of the hooks, and vice versa.

Each of these trolleys or carries is propelled along the track by an endless chain 38 driven by suitable power means (not shown) and interengaged with brackets 20. A large number of trolleys are mounted on the endless track 14 to suit the specific needs for which the conveyor is employed. Only one is shown since a showing of a plurality of like trolleys would not add anything significant to the disclosure and would only be superfluous.

At least one, and usually several, of the detectors 12 are mounted at strategic locations along the track. Each detector includes a support platform 40. This may be a section of channel iron secured to the track, or any suitable equivalent. Depending from platform 40 is a plurality of suspension legs 42, here shown to be four in number. These are welded at their upper ends to the platform, and at their lower ends to a pair of channel sections 44. These sections 44 define a guide track to prevent side sway of the carrier when passing through the detector, and to assure alignment of wheels 32 with cam tracks 52 (to be described). The inlet mouth of the guide is considerably wider than the remainder of the track due to the divergent relationship of the front ends of elements 44. The purpose of the wide mouth is to assure smooth entry of plate 24. The plate 24 passes directly between elements 44 as each carrier passes a detector.

Secured transversely of the track and on platform 40 is a tubular bearing sleeve 46. A rod 48 extends therethrough. To the ends of the rod is mounted a pair of depending arms 50. At the lower ends of these arms is mounted a pair of downwardly and forwardly inclined track elements 52 in alignment with wheels 32 on each trolley 18. These sloping tracks may be thought of as carrier ramps being slanted upwardly or downwardly depending upon the form of the invention employed (see FIGS. 5 and 6). Camming track elements 52, as well as depending arms 50 and rod 48, are pivotal with respect to sleeve 46, to move from the normal position illustrated in FIG. 1 to the raised position illustrated in phantom in FIG. 3.

Extending through a slot in the center of sleeve 46, upwardly from rod 48, and affixed to rod 48, is an ear 54 which also rotates with rod 48 when cam track elements 52 are pivotally raised. A tension spring extends between ear 54 and bolt 66. Ear 54 is normally biased against an adjustable stop 56 formed by a bolt threaded through a fixed flange 58. The bias is caused by the bias of tension spring 60 and the weight of the camming tracks 52. Bolt stop 66 is threaded into bracket 62, which is welded to platform 40.

The stop 56 may be adjusted to control the normal vertical position of camming elements 52. The tension of spring 60 may also be adjusted, utilizing the threaded connector 66 and its cooperative nut, to thereby control the lifting force required to be applied to camming tracks 52 to overcome the biasing force and pivot the camming elements, rod 48, and ear 54 within sleeve 46. Instead of collar 46 being used as the bearing mount, a suitable pair of pillow blocks or other equivalent may be readily substituted.

Pivoting of ear 54 with rod 48 a predetermined minimum against the bias causes a contact of the ear with a projecting plunger 68 of a triggering controller 70. This controller is thus a triggering means when activated, and may comprise an electrical limit switch, a hydraulic valve, a pneumatic valve, a solenoid actuator, a mechanical trigger, or any other equivalent controller, whether electrical, hydraulic, pneumatic or mechanical.

Figure 2:
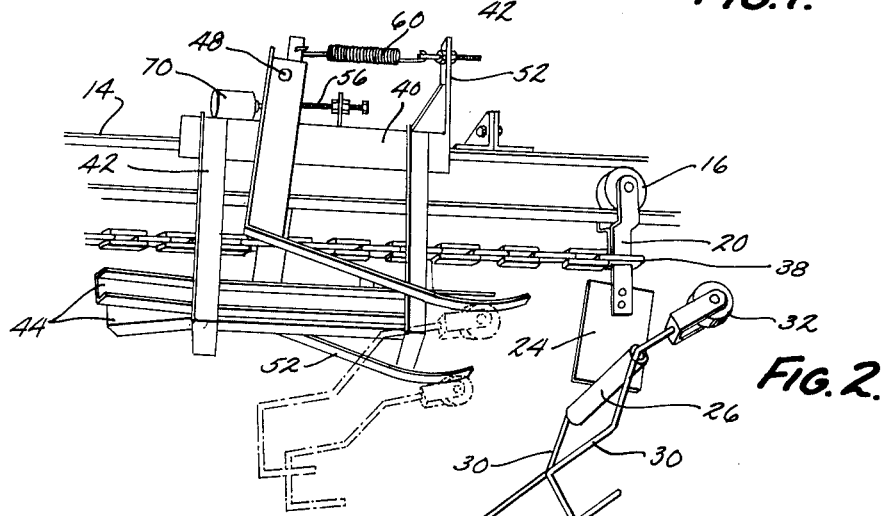
FIG. 2 is a perspective view taken from beneath and alongside of the apparatus illustrated in FIG. 1.

The mechanism differentiates between carriers having at least a predetermined minimum load, and those which do not, i.e. partially or completely unloaded. More specifically, referring to FIGS. 1 and 2, as carrier 18 is propelled by chain 38 through detector 12, plate 24 passes within the path defined by the two cooperative guide elements 44, to align the wheels 32 with downwardly sloping camming track surfaces 52.

If the carrier is unloaded, as the wheels pass down the slope of cam surfaces 52, the carrier will be slowly and progressively rotated in a counterclockwise direction (as viewed in phantom in FIG. 2 of the drawings) until the wheels pass the ends of the tracks. The weight of the hooks will then orient the device to an upright position again. The trolley was thus shifted, but the detector did not have sufficient movement to move the minimum amount necessary to activate the triggering means. The tension of spring 60 is previously set to a predetermined value so that an unloaded trolley, or even a partially loaded one does not have sufficient weight to raise the camming arms 52 against the biasing force of spring 60 and the weight of tracks 52 to shift ear 54 against the plunger of the triggering mechanism the minimum amount. A partially loaded carrier will lift tracks 52 slightly, but still not enough to activate the trigger means.

The hook supports are arranged so as not to unload. It will be realized that the load supporting means of the trolleys may be widely varied, the illustrated form being exemplary.

If, on the other hand, a carrier is loaded with at least the predetermined minimum, when wheels 32 proceed along the inclined camming surfaces 52, the weight of the trolley load on the lower hooks prevents the carrier from being rotated in a counterclockwise direction as previously. Rather, the load indirectly creates a lifting force on sloping camming tracks 52 to lift them against their bias (as illustrated in FIG. 3), thereby causing the detection mechanism to pivot on rod 48 within sleeve 46. This detector rotation is caused since the carrier resists rotation to move the load from directly beneath pivotal rod 28 and sleeve 26 against the force of gravity. The force moment resisting carrier rotation is thus greater than the force moment resisting detector rotation. This prevents the wheels on the opposite side of fulcrum rod 28 from being depressed with counterclockwise rotation.

When the triggering means is activated by the loaded carrier, an output signal results from the triggering means, in the form of a mechanical, electrical, pneumatic, hydraulic, magnetic or other control impulse to control any other apparatus or device desired. The potential uses of the control impulse are legion.

In fact, a number of these detectors may be located along the conveyor route to activate any of several different types of mechanism downstream of the detector.

Activation of each individual detector may create a counting impulse, control a routing gate, control a reading mechanism, actuate an unloading system, or a further process step, or trigger any other one or more of countless subsequent operations.

After each carrier passes a detector, if the detector is pivoted, the tension spring 60 returns the assembly until ear 54 abuts against adjustable stop 56, making the unit immediately ready to respond to a following carrier.

It will be seen that by simply adjusting nut 63 on threaded eye bolt 66, the tension of spring 60 is readily varied over a fairly wide range to control the weight of the minimum load required to depress the mechanism enough to activate trigger plunger 68.

Figures 4, 7:
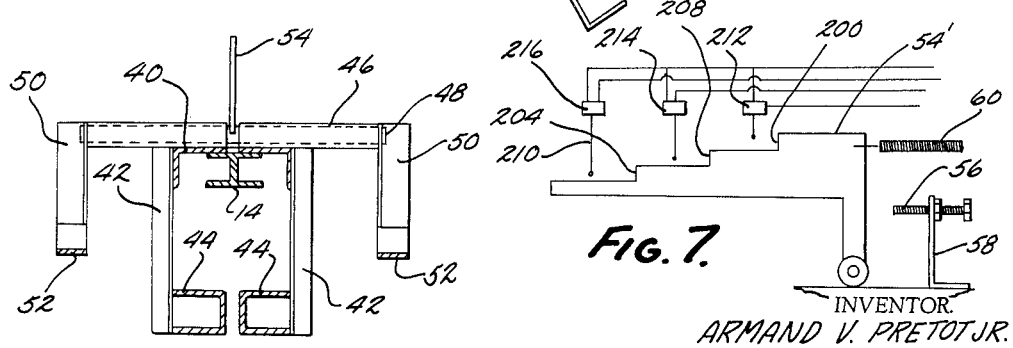
FIG. 4 is a sectional view taken on plane IV—IV of the apparatus illustrated in FIG. 2.
FIG. 7 is a fragmentary view of a modified form of the apparatus.

Conceivably, instead of the triggering means being an "on-off" device responsive at only one depressed position to produce only one output signal, it may trigger a series of graduated reactions depending upon the degree of plunger shift. For example, a partially loaded carrier could trigger one type of loading operator or one type of gate, a fully loaded carrier could trigger another type, etc. The degrees of graduation could be several. This could be achieved if the triggering means is an electrical switch by having a series of adjacent switch contacts. If it is a pneumatic or hydraulic valve, a series of adjacent ports could be covered or uncovered. Or referring to FIG. 7, adjacent mechanical abutment surfaces 200, 202, and 204 on modified elongated actuator 54' may be positioned at graduated spacings A, B, and C from electrical switch arms 206, 208, and 210 respectively of switches 212, 214, and 216. Since C is greater than B is greater than A, a light load will cause actuation of switch 212, a heavier load switch 214, and a still heavier load switch 216.

MODIFICATION

Although the inventive detection and/or control system was originally devised for overhead conveyors, it is also adaptable in different forms, to other types of conveyors, whether power or gravity operated. One example is shown in the modified construction illustrated in FIGS. 5 and 6.

In this form of the invention, carrier 80 is mounted on a plurality of wheels 82 designed to convey the carrier along a track 84 of suitable type.

Mounted along track 84 is at least one of the modified detection units. It includes a bracket 86 secured beneath the track. Depending from bracket 86 is a plurality of suspension supports 88 which support platform 90. Secured to this platform is a sleeve 92 (similar to sleeve 46 on the first modification), and having a pivot rod 93 therein. To the end of the rod is secured a single cam track surface 94 which slopes upwardly. This cam track is biased to the raised position illustrated in FIG. 5 by tension spring 96 extending between ear 98 and bracket 100 secured to platform 90.

Adjacent the ear is a triggering controller 102 having a reciprocal plunger element 104 to be depressed by ear 98. Track 94 is mounted on the upright support 95, which is affixed to rod 93.

Secured to conveyor load carrier 80, and depending therefrom, is a supplemental wheel 106 in alignment with inclined track surface 94. When the carrier is unloaded, tension spring 96 prevents the cam surface or ramp 94 from being depressed by the carrier as wheel 106 rides up over the track under the weight of the carrier. This reaction therefore causes the one side of the carrier to raise and tilt the carrier as illustrated in phantom in FIG. 6. If, however, the carrier is loaded with a predetermined load sufficiently great enough to substantially overcome the bias of tension spring 96, wheel 106 depresses track 94 around the pivot axis of shaft 93, causing ear 98 to move away from stop 99 and depress plunger 104 of detector 102. If plunger 104 is depressed more than the minimum the detector emits an electrical signal, opens an hydraulic or pneumatic valve or causes some other motive signal reaction to control a subsequent operation or function. The amount of tilt of the load-bearing carrier will be readily controlled by the spacing between the triggering means and the load-responsive, shiftable detector.

Instead of the triggering reaction being caused by shifting of the detector cam track, it may alternatively be caused by shifting of the unloaded carrier. In fact each action could create a different reaction when occurring. More specifically, in addition to, or instead of, the detector shift sensor 102 being responsive to the detector shifting, a sensor or triggering means 120 may be mounted by a suitable bracket support 122 to cause trigger plunger 124 to be in the path of the tilting carrier 80. (The bracket can be attached to the conveyor track.) The carrier, therefore, when tilted (i.e. shifted), would cause a response output impulse by movement of plunger 124 a minimum amount. The signal from the empty carrier could control different apparatus than from the loaded one.

It will be obvious from the illustrated forms of the invention that various other modifications may be made of the inventive apparatus employing the principles taught. Consequently, these obvious modifications are deemed to be part of this invention, which is to be limited only by the scope of the appended claims and the reasonably equivalent structures to those defined therein.

I claim:
1. A conveyor system comprising a track and at least one load carrier mounted on said track to move one direction therealong; carrier load differentiating means mounted along said track; said differentiating means comprising: an elongated shiftable cam track detector biased in increasing amounts into the path of said carrier in said direction; sensor means responsive to a shift of predetermined magnitude by said detector means; contact means on said carrier to engage and ride along said cam track with passing of said carrier; said detector means being shiftable out of said carrier path to said predetermined magnitude against the biasing force by engagement with said contact means on a carrier loaded to a predetermined weight to actuate said sensor; and said detector means causing temporary shifting of carriers having loads below said weights by causing said contact means to follow said cam track, to thereby differentiate therebetween.

2. A conveyor system comprising: track means; at least one load carrier on said track means; at least one detector means along said track means for detecting loaded carriers; said detector means including elongated slanted cam track means in the path of said carrier; said cam track means being shiftable from a normal position in the path of said carrier, to a second position out of the path of said carrier; biasing means biasing said cam track means into said normal position in the path of said carrier with a preset biasing force; said carrier being biased toward said cam track means by the weight of a load on the carrier; said carrier being shiftable temporarily by said cam track means to follow the surface thereof if the carrier load is insufficient to overcome said biasing means; and said cam track means being shifted by a loaded carrier with a predetermined load sufficient to overcome said biasing means, to align with the direction of movement of said carrier, to detect the loaded condition.

3. The system in claim 2 wherein said detector means has sensor triggering means responsive to a significant shift of said cam track means.

4. The system in claim 2 wherein said detector means has sensor means responsive to the shift of said carrier.

5. A conveyor system comprising: a track means, and at least one load carrier mounted on said track means to move therealong; detector means along said track means including a ramp, said load carrier having ramp contacting means; said ramp being biased into the path of said contacting means to cause an unloaded carrier to be shifted thereby while said contacting means traverse said ramp with passing; said ramp being shiftable out of said path against its bias by the contacting means of a loaded carrier; and sensor means activated by the shifted ramp to detect loaded carriers.

6. The system in claim 5 wherein said carrier comprises a suspension trolley, and said ramp depends into the path of a portion of said trolley.

7. The system in claim 5 wherein said ramp is biased by an adjustable biasing means, to enable control of the load weight required to shift said ramp.

8. The system in claim 7 wherein said suspension trolley is pivotally mounted to be pivoted by said ramp when unloaded, and said ramp is pivotally mounted to be pivotally shifted by a loaded trolley.

9. A conveyor system comprising: a trolley track; at least one trolley suspension bracket mounted rollably on said track, suspended therefrom, and movable therealong; a trolley pivotally mounted on said bracket on a horizontal pivot axis, and suspended therefrom; endless drive means engaged with said bracket; a pair of ramp-engaging elements projecting upwardly from said trolley above said horizontal pivot axis; a load differentiating cam track assembly above said track, including a pair of elongated downwardly sloped tracks projecting into the path of said elements; said assembly being mounted on a pivotal axis allowing shifting of said sloped tracks out of the path of said elements; biasing means biasing said sloped tracks into the path of said elements; said biasing means being unshiftable by an empty trolley, causing the elements of a passing carrier to follow said sloped tracks by pivoting of said trolley on said horizontal pivot axis, and said biasing means being shiftable by a loaded trolley due to engagement of said elements with said sloped tracks, causing shifting of said tracks on said assembly pivot axis; and sensor means mounted adjacent said assembly and actuatable by shifting of said assembly to thereby be actuated only with passing of a loaded trolley but not of an unloaded trolley.

References Cited by the Examiner

UNITED STATES PATENTS 3,116,823  1/64  Schneider _____ 198—127

SAMUEL F. COLEMAN, *Primary Examiner.*